(12) United States Patent
Bolin et al.

(10) Patent No.: US 9,485,034 B2
(45) Date of Patent: Nov. 1, 2016

(54) DEVICE WITH EXTERNAL METAL FRAME AS COUPLING ELEMENT FOR BODY-COUPLED-COMMUNICATION SIGNALS

(71) Applicant: Sony Corporation, Tokyo (JP)

(72) Inventors: Thomas Bolin, Lund (SE); Zhinong Ying, Lund (SE); Kun Zhao, Stockholm (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/452,943

(22) Filed: Aug. 6, 2014

(65) Prior Publication Data

US 2016/0043812 A1 Feb. 11, 2016

(51) Int. Cl.
*H04M 1/00* (2006.01)
*H04B 13/00* (2006.01)
*H04M 1/02* (2006.01)
*H04W 4/00* (2009.01)
*H04W 84/12* (2009.01)

(52) U.S. Cl.
CPC ......... *H04B 13/005* (2013.01); *H04M 1/0202* (2013.01); *H04W 4/008* (2013.01); *H04W 84/12* (2013.01)

(58) Field of Classification Search
USPC ....................................................... 455/550
See application file for complete search history.

(56) References Cited

U.S. PATENT DOCUMENTS

2009/0149212 A1 6/2009 Kano
2013/0231046 A1* 9/2013 Pope .................. G06K 9/00013
455/41.1

FOREIGN PATENT DOCUMENTS

WO WO-2013/012869 A1 1/2013

OTHER PUBLICATIONS

PCT International Search Report dated Apr. 13, 2015, issued on corresponding PCT International Patent Application No. PCT/EP2015/050390.
Namjun Cho et al., "A Planar MICS Band Antenna Combined with a Body Channel Communication Electrode for Body Sensor Network", IEEE Transactions on Microwave Theory and Techniques, vol. 57, No. 10, Oct. 1, 2009, pp. 2515-2522.
Namjun Cho et al., "A 10.8mW body-channel-communication/MICS dual-band transceiver for a unified body-sensor-network controller", Solid-State Circuits Conference—Digest of Technical Papers, 2009, IEEE International, Feb. 8, 2009, pp. 424-425, 425a.

* cited by examiner

*Primary Examiner* — Martin Mushambo
(74) *Attorney, Agent, or Firm* — Wolf, Greenfield & Sacks, P.C.

(57) ABSTRACT

A device is equipped with at least one communication module. The communication module supports communication on the basis of body-coupled-communication signals. Further, the device is equipped with a metal frame. The metal frame forms a part of an outer surface of the device. The metal frame is operable to provide conductive coupling of the of body-coupled-communication signals to a body of a user of the device.

21 Claims, 8 Drawing Sheets

DEVICE WITH EXTERNAL METAL FRAME AS COUPLING ELEMENT FOR BODY-COUPLED-COMMUNICATION SIGNALS

FIELD OF THE INVENTION

The present invention relates to a device supporting body-coupled-communication (BCC) and to a method of communication using BCC signals.

BACKGROUND OF THE INVENTION

The BCC technology is based on utilizing a body of a living being as a transmission medium for communication signals. It may be used for establishing a communication link between devices which are in close proximity or contact with the body. Such devices may for example correspond to medical sensors or monitoring devices. However, the BCC technology may also be used for other kinds of devices, e.g., for connecting a smart phone or similar user device to another device.

For supporting BCC connectivity of a device, it typically needs to be provided with a BCC coupling element. Such BCC coupling element may for example comprise an electrode for providing capacitive coupling to the body. On the other hand, the available space on the device may be limited. For example, the device may be a mobile phone or smartphone, and the available space for the BCC electrodes may be limited by the device design. Further, the BCC electrodes may need to share the available space with other elements of the device, such as antennas, a display, or the like.

Accordingly, there is a need for techniques which allow for efficiently supporting BCC in a device.

SUMMARY OF THE INVENTION

According to an embodiment of the invention, a device is provided. The device comprises at least one communication module. The communication module supports communication on the basis of BCC signals. Further, the device comprises a metal frame. The metal frame forms a part of an outer surface of the device. The metal frame is operable to provide conductive coupling of the BCC signals to a body of a user of the device.

According to an embodiment, the at least one communication module further supports communication on the basis of radio signals. The metal frame may then further operable as an antenna for transmission of the radio signals.

The radio signals may be based on a cellular radio technology, such as the GSM (Global System for Mobile Communication), UMTS (Universal Mobile Telecommunications System), CDMA2000, or LTE (Long Term Evolution) cellular radio technology. Alternatively or in addition, the radio signals may be based on a WLAN (wireless local area network technology) radio technology, e.g., as specified in the IEEE 802.11 standard family. Alternatively or in addition, the radio signals may be based on a (WPAN) wireless personal area network radio technology, such as Bluetooth or ZigBee. Alternatively or in addition, the radio signals may be based on a satellite navigation technology, such as GPS (Global Positioning System).

According to an embodiment, the device comprises at least one frequency selective element connected between the metal frame and the at least one communication module. The at least one frequency selective element provides a first signal path in a first frequency range corresponding to the BCC signals and a second signal path in a second frequency range corresponding to the radio signals. The first frequency range may extend below 50 MHz, and the second frequency range may extend above 400 MHz. The first signal path may have a low-pass filter characteristic and the second signal path may have a high-pass filter characteristic. According to an embodiment, the first signal path comprises a resonant circuit having a resonant frequency in the second frequency range.

According to an embodiment, the device further comprises an electrode which is operable to provide capacitive coupling of the BCC signals to the body of the user. This electrode may further serve as a ground plane with respect to the utilization of the metal frame as an antenna for the transmission of the radio signals. Accordingly, also a grounding connection may be provided between the electrode and the metal frame. This grounding connection may have a high-pass filter characteristic which blocks the first frequency range.

According to an embodiment, the device is configured to prevent simultaneous contact of the body of the user with the metal frame and the electrode. This may for example be achieved by electrically isolating the electrode from the outer surface of the device.

According to an embodiment, the device further comprises a display which is visible on a part of said outer surface, e.g., on a front surface. The part of the outer surface which is formed by the metal frame may then peripherally surround the part on which the display is visible. The part of the outer surface which is formed by the metal frame may thus correspond to a part of the outer surface which has contact with the user's hand when the user grips the device to look at the display.

According to an embodiment, the metal frame forms a single continuously conductive surface around a periphery of the device. Alternatively, the metal frame forms multiple conductive surfaces arranged around a periphery of the device. For example, the metal frame may be segmented into electrically conductive frame portions which are separated by electrically isolating frame portions.

According to a further embodiment of the invention, a method is provided. According to the method, a device communicates data on the basis of BCC signals. Via a metal frame which forms a part of an outer surface of the device, the device provides conductive coupling of the BCC signals to a body of a user of the device. The device may have structures and be configured as described above.

According to an embodiment, the device further communicates data on the basis of radio signals and utilizes the metal frame as an antenna for transmission of the radio signals. As mentioned above, the radio signals may be based on at least one of: a cellular radio technology, a wireless local area network technology, a wireless personal area network radio technology, and a satellite navigation technology.

According to an embodiment, the device provides a first signal path to the metal frame and a second signal path to the metal frame. The first signal path is frequency selective in a first frequency range corresponding to the BCC signals. The second signal path is frequency selective in a second frequency range corresponding to the radio signals. The first frequency range may extend below 50 MHz, and the second frequency range may extend above 400 MHz. The first signal path may have a low-pass filter characteristic, and the second signal path may have a high-pass filter characteristic.

The first signal path may also provide a resonant frequency in the first frequency range, in proximity to a carrier frequency of the BCC signals.

The above and further embodiments of the invention will now be described in more detail with reference to the accompanying drawings.

DETAILED DESCRIPTION OF EMBODIMENTS

Figure 1:
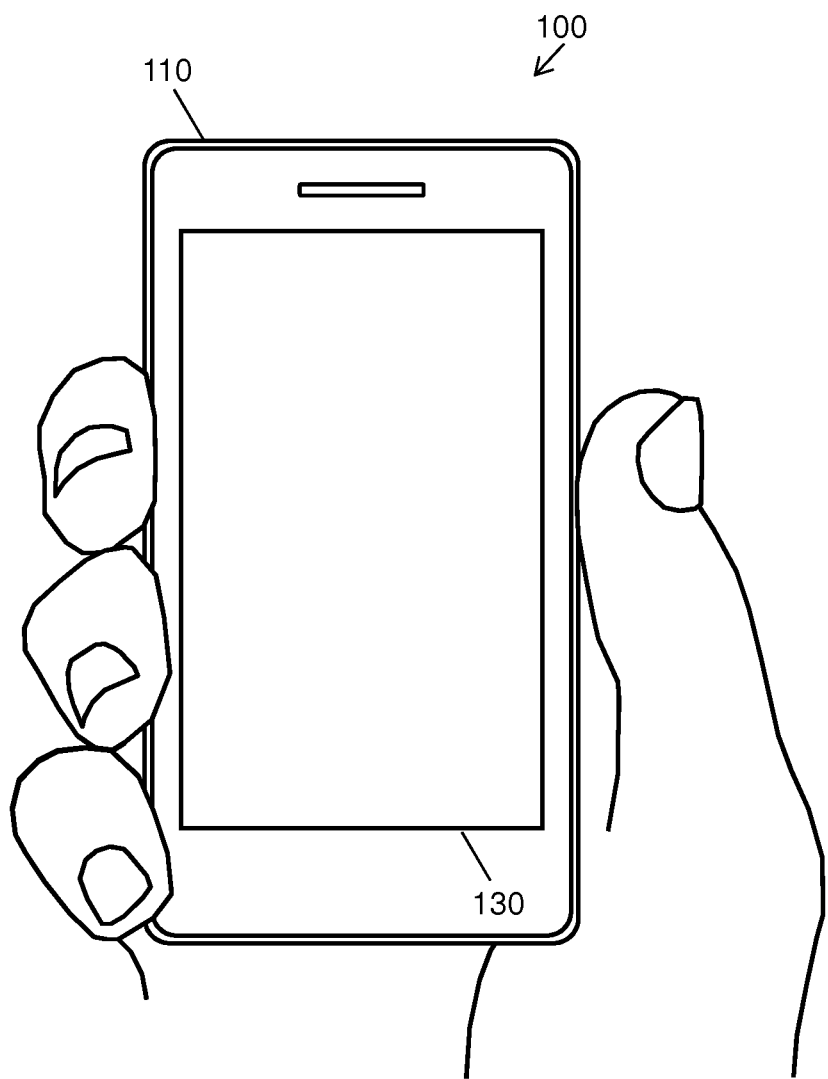
FIG. 1 schematically illustrates a device according to an embodiment of the invention.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to a device which supports BCC connectivity and typically also radio connectivity. The device may for example be a communication device, such as a smart phone or mobile phone. The device may also correspond to a portable computing device, such as a training computer, a health monitor, or an entertainment device, such as a media player or portable gaming device.

The radio connectivity may be based on one or more radio technologies, such as GSM, UMTS, LTE, or CDMA2000. Alternatively or in addition, the radio connectivity may also be based on a WLAN technology or on a WPAN radio technology, such as Bluetooth, NFC, or ZigBee. Still further, the radio connectivity may support reception of satellite navigation signals, such as GPS signals. In the illustrated embodiments, the radio connectivity is assumed to utilize radio signals in a frequency range above 400 MHz, in particular above 600 MHz, while the BCC connectivity is assumed to utilize BCC signals in a frequency range below 50 MHz, typically below 20 MHz. The BCC signals are assumed to be transmitted via the body of a user of the device. For example, the BCC signals may be transmitted between the device and one or more other devices located on or in close proximity to the user's body and equipped with BCC connectivity. Such other device may for example be wearable device, e.g., a wristband. Such other device may also correspond to a headset. In some application scenarios, the BCC signals may also be used for assisting in establishing a radio connection. For example, the BCC signals may be used to detect that another device is present on the user's body, and the BCC signals may then be used to trigger establishment of a radio connection to the other device, e.g., using the Bluetooth technology. In further application scenarios, the BCC signals may be used for locking or unlocking a lock, e.g., on a door or of a container, e.g., when the user touches the lock. In some applications, the BCC signals may also be used for payment services, e.g., for authorizing payment when the user touches a payment terminal or the like.

In the examples illustrated in the following, the device supports BCC connectivity and radio connectivity. For efficiently supporting the BCC connectivity, a metal frame is used as an electrode for conductively coupling to a body of the user. The metal frame forms a part of an outer surface of the device. Accordingly, when the user grips the device, electric contact between the user's body and the metal frame is typically established. In some scenarios, also capacitive coupling between the user's body and the metal frame may occur. Due to this conductive and/or capacitive coupling, the metal frame may be utilized as a BCC coupling element which transfers the BCC signals between the device and the user's body. In addition, the metal frame may be utilized as an antenna for transmission of the radio signals. In this way, the BCC connectivity can be supported in an efficient manner. In particular, by allowing conductive coupling to the user's body, the metal frame allows for efficiently exciting a strong electric field in the user's body and thereby establishing stable data communication on the basis of the BCC signals.

FIG. 1 schematically illustrates a typical implementation of the device 100. For example, in the implementation of FIG. 1 the device may correspond to a smart phone or to a portable multimedia player.

In the example of FIG. 1, the device 100 is provided with a display 130 which is visible on a part of the outer surface of the device 100. In the following, this part of the outer surface will also be referred to as front side. The display may for example be a touch display, which at the same time allows for detecting inputs of the user. In some implementations, also additional user input elements may be located on the front side of the device 100, such as mechanical buttons and/or touch sensitive sensors (not illustrated).

As further illustrated, a part of the outer surface of the device 100 is formed by a metal frame 110. In the illustrated example, the metal frame 110 forms a part of the outer surface which peripherally surrounds the front side. The metal frame may for example connect the front side of the device 100 and a back side of the device, which may be arranged substantially parallel to the front side. As illustrated, the metal frame 110 may have the form of a continuous ring. The metal frame 110 may be designed to provide structural stability of the device and/or may serve as a decorative element.

FIG. 1 also illustrates a typical way in which the user's hand may grip the device 100, e.g., when looking at the display. As can be seen, the user's hand is in contact with the metal frame, which typically results in conductive coupling between the metal frame 110 and the user's body. However, there may also be capacitive coupling between the metal frame 110 and the user's body. Both the conductive coupling and the capacitive coupling may be utilized for transferring the BCC signals between the device 100 and the user's body.

Figure 2:
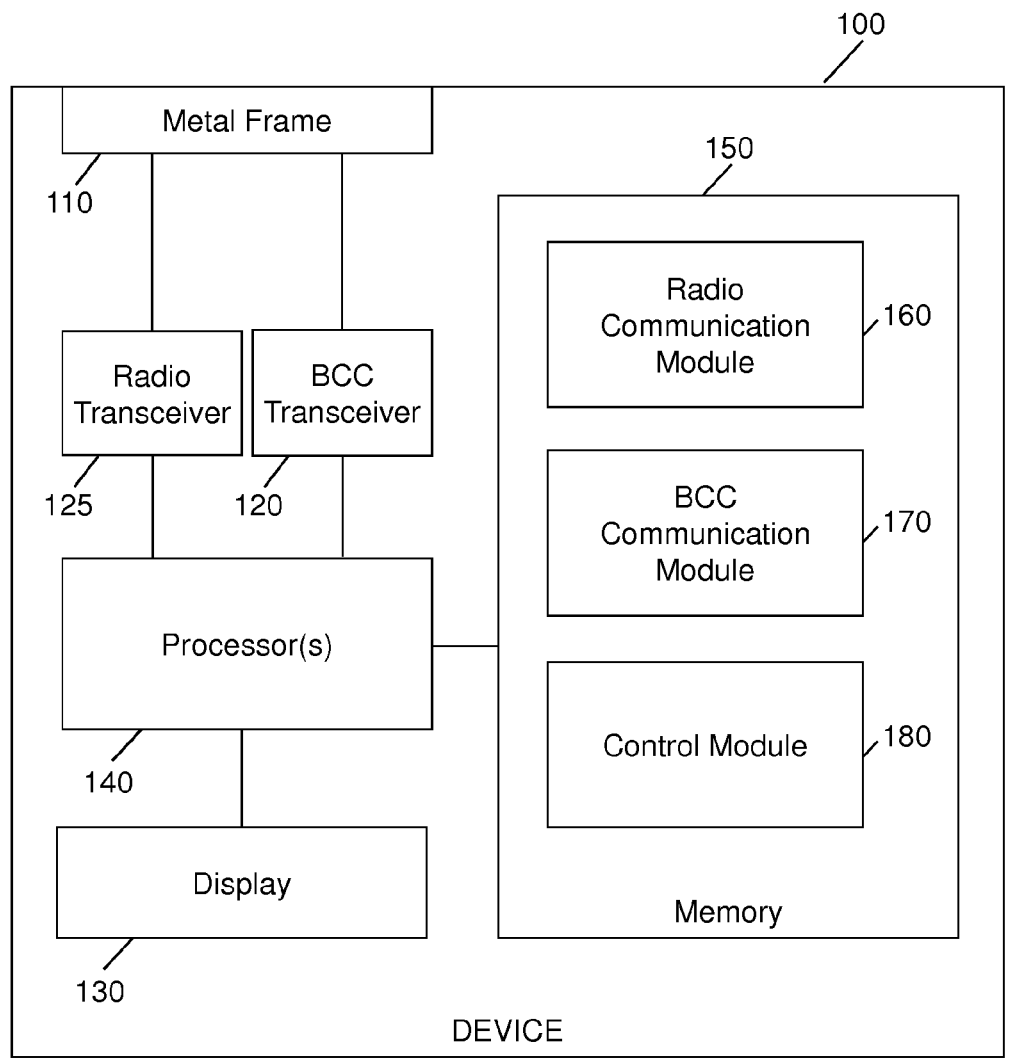
FIG. 2 shows a block diagram for illustrating structures and functionalities of the device.

FIG. 2 schematically illustrates exemplary structures for implementing the device 100.

As illustrated, the device 100 includes a BCC transceiver 120 and a radio transceiver 125. Both the BCC transceiver 120 and the radio transceiver 125 are coupled to the metal frame 110.

Further, the device 100 includes one or more processors 140 coupled to the RF transceiver 120 and to the BCC transceiver 130, and a memory 150 coupled to the processor(s) 140. The memory 150 includes program code modules 160, 170, 180 with program code to be executed by the processor(s) 140. In the illustrated example, these program code modules include a radio communication module 160, a BCC communication module 170, and a control module 180. As further illustrated, the one or more processors 140 are also coupled to the display 130, e.g., for controlling the displaying of information to the user.

The BCC transceiver 120, the processor(s) 140, and the BCC communication module 170 implement BCC communication functionalities of the device 100, i.e., may be regarded as a BCC communication module of the device 100. For example, the BCC transceiver 120 may provide hardware structures for physical layer processing of the BCC signals, e.g., for detection, modulation, demodulation, amplification, conversion, or the like. The program code of the radio communication module 170 executed by the processor(s) 140 may in turn provide higher layer functionalities, e.g., for encoding, decoding, error correction, or protocol handling.

The radio transceiver 125, the processor(s) 140, and the radio communication module 160 implement radio communication functionalities of the device 100, i.e., may be regarded as a radio communication module of the device 100. For example, the radio transceiver 125 may provide hardware structures for physical layer processing of the radio signals, e.g., for detection, modulation, demodulation, amplification, conversion, or the like. The program code of the radio communication module 160 executed by the processor(s) 140 may in turn provide higher layer functionalities, e.g., for encoding, decoding, error correction, or protocol handling.

The control module 180 may have the purpose of implementing generic control functionalities of the device 100, e.g., with respect to managing the radio communication functionalities and BCC functionalities.

It is to be understood that the structures as illustrated in FIG. 2 are merely exemplary and that the device 100 may also include other elements which have not been illustrated, e.g., structures or program code modules for implementing user interface functionalities of the device 100.

Figure 3:
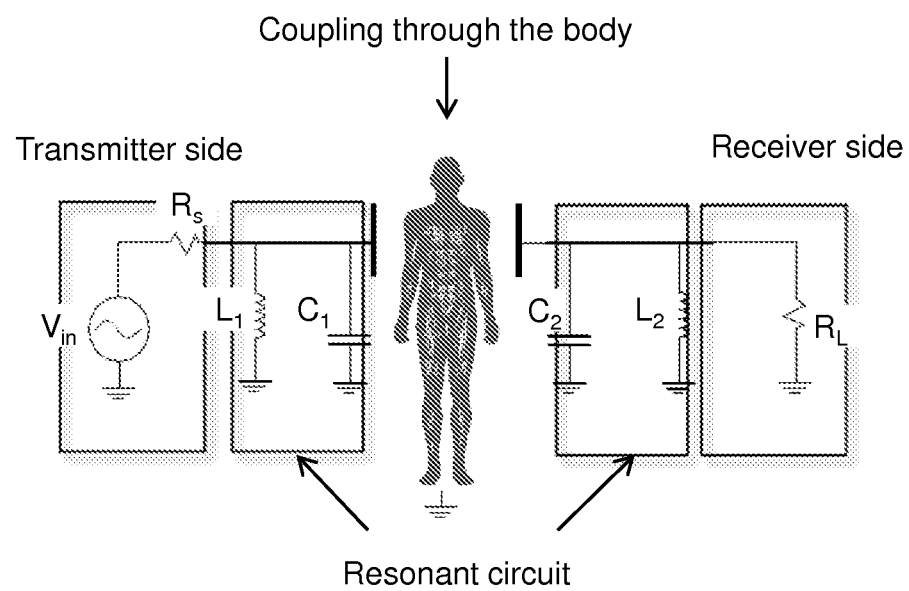
FIG. 3 schematically illustrates transmission of BCC signals according to an embodiment of the invention.

FIG. 3 schematically illustrates the transmission of the BCC signals from a transmitter to a receiver. Here, it is to be understood that the device 100 may either correspond to the transmitter or to the receiver.

As illustrated, the BCC signals are generated as oscillatory signals at the transmitter side, e.g., by an oscillator which provides an oscillatory voltage $V_{in}$. This oscillatory voltage $V_{in}$ may be modulated to allow the transmission of data via the BCC signals. Through a resonant circuit on the transmitter side, in FIG. 3 illustrated by a resistor $R_s$, an inductor $L_1$, and a capacitor $C_1$, the BCC signals are coupled to the user's body. As a general rule, this coupling may be conductive and/or capacitive. Through a further resonant circuit at the receiver side, in FIG. 3 illustrated by a capacitor $C_2$, an inductor $L_2$, and a resistor $R_s$, the BCC signals are coupled from the user's body to the receiver. Also on the receiver side, the coupling may be conductive and/or capacitive. The resonant circuits on the transmitter side and on the receiver side are typically designed to have a resonant frequency which is in proximity to a carrier frequency of the BCC signals, i.e., in the example of FIG. 3 to an oscillation frequency of the oscillatory voltage $V_{in}$.

Figure 4:
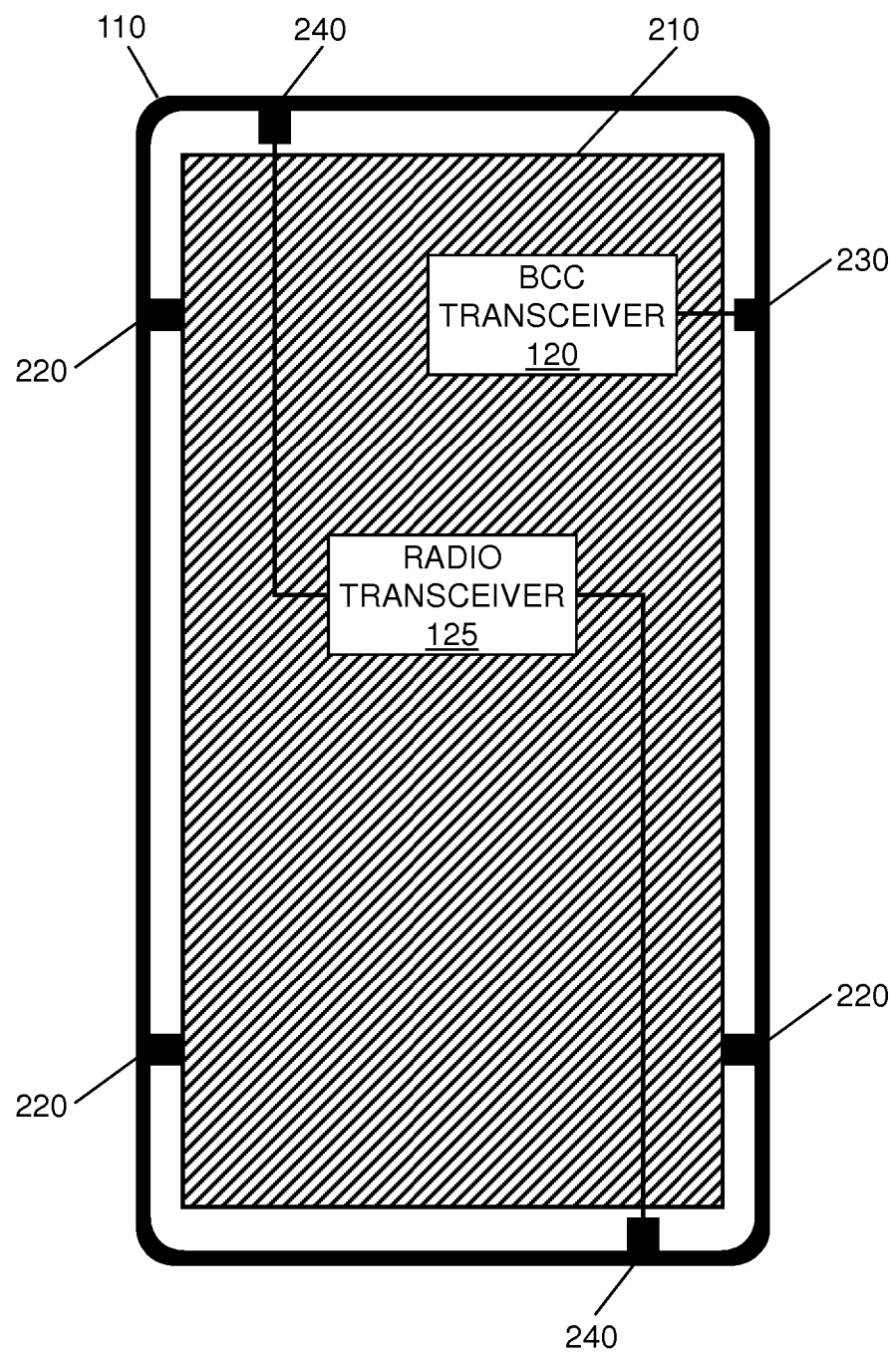
FIG. 4 schematically illustrates utilization of a metal frame according to an embodiment of the invention.

FIG. 4 schematically illustrates how the metal frame 110 of the device 100 can be utilized as coupling element for the BCC signals and as an antenna for transmission of the radio signals.

As illustrated in FIG. 4, in addition to the metal frame 110, the device 100 is provided with a further electrode 210. With respect to the transmission of the radio signals utilizing the metal frame 110 as antenna, the electrode 210 may act as a ground plane. With respect to the coupling of the BCC signals to the user's body, the electrode 210 may act as a counter electrode with respect to the metal frame and may provide capacitive coupling to the user's body. For this purpose, it is typically desirable to avoid simultaneous contact of the user's body to the metal frame 110 and to the electrode 210. The device 100 may be designed to prevent such contact, e.g., by electrically isolating the electrode 210 from the outer surface of the device 100. For example, the electrode could be placed in the interior of the device, e.g., on a printed circuit board. As a further design criterion, a large surface area of the electrode 210 may be beneficial for both its functionality as a ground plane and as a counter electrode for the capacitive coupling to the user's body. In this respect, it may also be beneficial to avoid conductive shielding of the electrode 210.

To support the utilization of the metal frame 110 as an antenna, typically one or more grounding connections between the metal frame 110 and the ground plane 210 may be provided. In the example of FIG. 4, a number of such grounding connections 220 is distributed over the peripheral extension of the metal frame 210. With respect to the radio signals, the grounding connections 220 act as a closed circuit. By suitably selecting the number and positions of the grounding connections, various kinds of antenna geometry can be realized, e.g., inverted L-type, F-type, or ring-type antenna geometries. On the other hand, to support the utilization of the metal frame 110 as a coupling element for the BCC signals, short-circuiting of the BCC signals over the grounding connections 220 should be avoided. This may be achieved by providing the grounding connections 220 with a high-pass filter characteristic having a cutoff frequency which is above the frequency range of the BCC signals, e.g., above 50 MHz.

As further illustrated, a feed connection 230 for the BCC signals is provided between the BCC transceiver 120 and the metal frame 110. The feed connection 230 may be provided with a low-pass filter characteristic having a cutoff frequency which is below the frequency range of the radio signals. In this way, coupling of the radio signals to the BCC transceiver 120 may be avoided. Further, the feed connection 230 may provide a resonant circuit having a resonant frequency which is in the frequency range of the BCC signals, typically in proximity to a carrier frequency of the BCC signals.

As further illustrated, one or more feed connections 240 for the radio signals may be provided between the radio transceiver 125 and the metal frame 110. The feed connection 230 may be provided with a high-pass filter characteristic having a cutoff frequency which is above the frequency range of the BCC signals. In this way, coupling of the BCC signals to the radio transceiver 125 may be avoided. Further, the feed connections 240 may provide a matching circuit, e.g., for impedance adaptation purposes. The number and the positions of the feed connections 240 may depend on the utilized antenna geometry, e.g., inverted L-type, F-type or ring type.

In the example of FIG. 4, the metal frame 110 was assumed to be a continuous metallic ring, i.e., to form a single continuously surface around the periphery of the device. However, it is also possible that the metal frame forms multiple conductive frame segments, which are separated by electrically isolating frame segments. A corresponding example is illustrated in FIG. 5.

Figure 5:
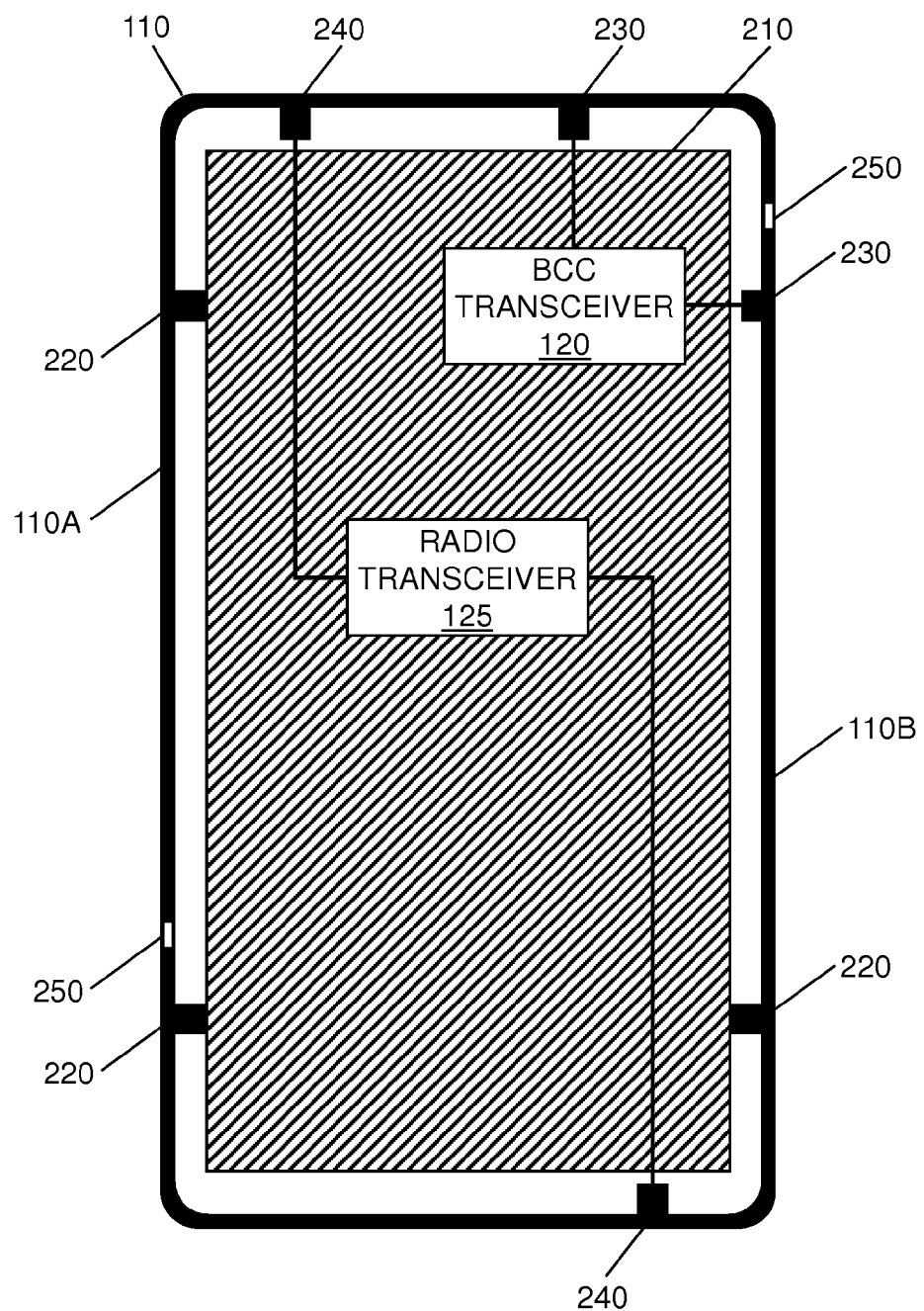
FIG. 5 schematically illustrates utilization of a metal frame according to a further embodiment of the invention.

In the example of FIG. 5, the metal frame 110 is divided into a first conductive frame segment 110A and a second conductive frame segment 110B, which are separated by electrically isolating frame segments 250. This structure may facilitate optimization of antenna characteristics with respect to different kinds of radio signals. For example, the frame segment 110A could be optimized for utilization as an antenna for radio signals based on a cellular radio technology, and the frame segment 110B could be optimized for utilization as an antenna for radio signals based on another cellular radio technology, a WLAN radio technology, a WPAN radio technology, or a satellite navigation technology.

As illustrated, in the example of FIG. 5 a feed connection 230 for the BCC signals is provided between the BCC transceiver 120 and each of the frame segments 110A, 110B. In this way, each of the frame segments 110A, 110B can be utilized as a coupling element for the BCC signals, which allows for efficient coupling of the BCC signals to the user's body.

It is to be understood that the geometries illustrated in FIGS. 4 and 5 are merely exemplary and for example the positioning and/or number of the grounding connections 220, the positioning and/or number of the feed connections 230, the positioning and/or number of the feed connections 240, and/or the positioning and/or number of the electrically isolating frame segments may vary depending on various design or implementation requirements.

Figure 6:
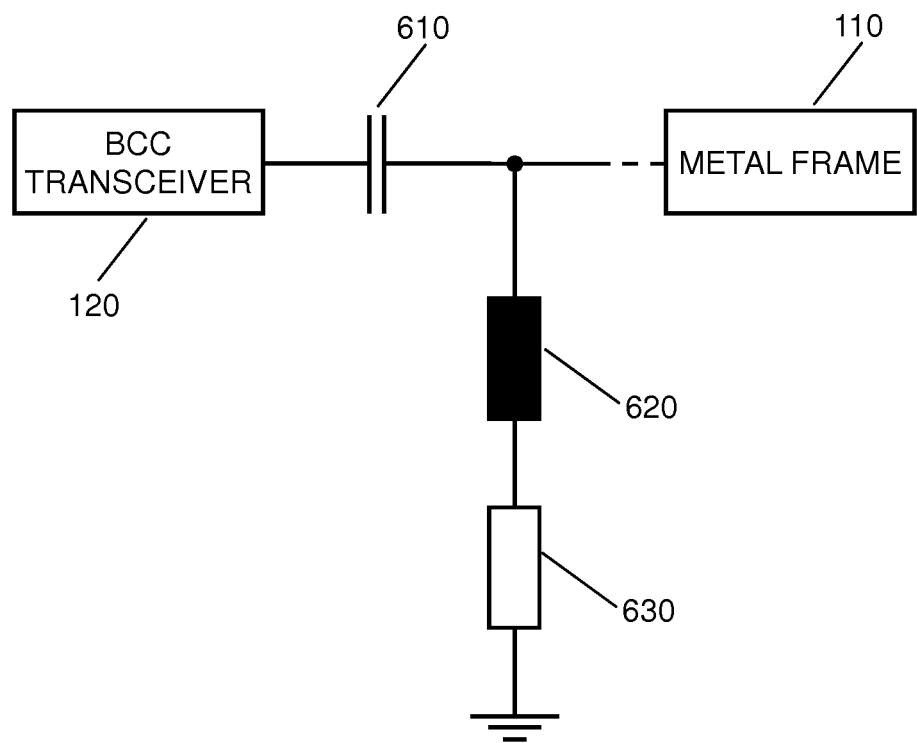
FIG. 6 schematically illustrates a resonant circuit as utilized according to an embodiment of the invention.

FIG. 6 schematically illustrates an exemplary resonant circuit which may be utilized in the feed connection 230 for the BCC signals. As illustrated, the resonant circuit includes a capacitor 610 which is connected between the BCC transceiver 120 and the metal frame. Further, the resonant circuit includes a branch which connects one terminal of the capacitor 610 via an inductor 620 and a resistor 630 to ground.

It is to be understood that additional elements could be provided between the BCC transceiver 120 and the metal frame, e.g., a low-pass filter which blocks signals in a frequency range of the radio signals.

Figure 7:
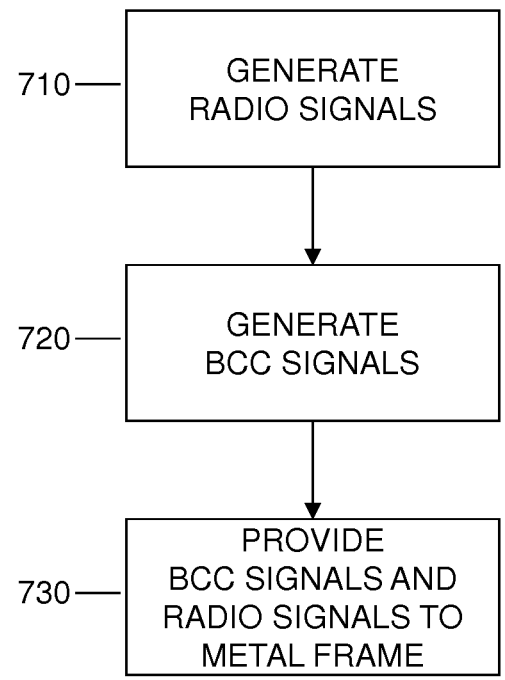
FIG. 7 shows a flowchart for illustrating a method of sending data according to an embodiment of the invention.
Figure 8:
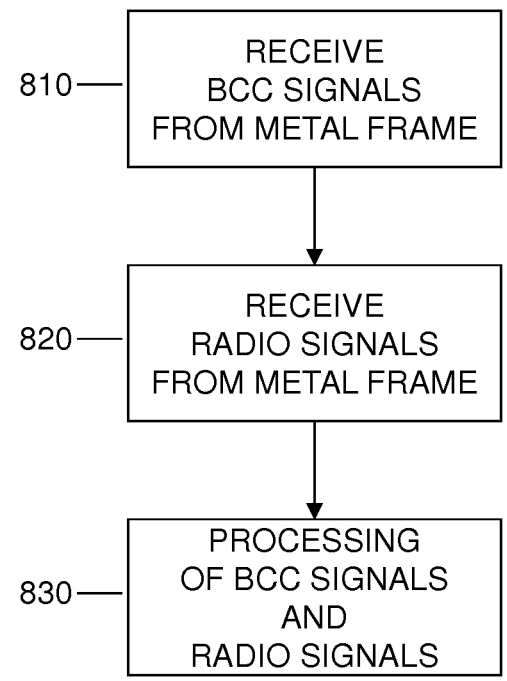
FIG. 8 shows a flowchart for illustrating a method of receiving data according to an embodiment of the invention.

FIGS. 7 and 8 show flowcharts for illustrating methods which may be used for implementing communication of data using the above-described concepts. These methods involve that a device communicates data on the basis of BCC signals via a metal frame which forms a part of an outer surface of the device. The metal frame provides conductive coupling of the BCC signals to a body of a user of the device. Further, the device may also communicate data on the basis of radio signals and utilize the metal frame as an antenna for transmission of the radio signals.

The device may for example correspond to the above-mentioned device 100, and execution of the method steps described in the following may be controlled by the processor(s) 140 of the device 100, e.g., on the basis of program code stored in the memory 150.

FIG. 7 illustrates a method which may be used for sending of data by the device.

At step 710, the device generates BCC signals. The BCC signals may for example be in a first frequency range below 50 MHz, more specifically below 20 MHz. The generation of the BCC signals may for example be performed by a communication module of the device, e.g., as in the case of the device 100 implemented by the BCC transceiver 130 and the processor(s) 140 executing the program code of the BCC communication module 170. The generation of the BCC signals may for example involve encoding of data and/or modulation of one or more carriers with the data.

At step 720, the device may generate radio signals. The radio signals may for example be in a second frequency range above 400 MHz, typically above 600 MHz. The radio signals may be based on one or more cellular radio technologies, e.g., GSM, UMTS, LTE, CDMA2000. In addition or as an alternative, the radio signals may be based on a WLAN technology and/or on a WPAN radio technology, such as Bluetooth, NFC, or ZigBee. The generation of the radio signals may for example be performed by a communication module of the device, e.g., as in the case of the device 100 implemented by the radio transceiver 125 and the processor(s) 140 executing the program code of the radio communication module 160. The generation of the radio signals may for example involve encoding of data and/or modulation of one or more carriers with the data.

At step 730, the device provides BCC signals to the metal frame. Further, the device may also provide the radio signals to the metal frame. Accordingly, the metal frame of the device may act as a BCC coupling element for transferring the BCC signals to the body of the user, e.g., by conductive coupling or a combination of conductive coupling and capacitive coupling. Further, the metal frame may be operated to convert the radio signals to electromagnetic waves for transmitting data from the device.

For the simultaneous transfer of the BCC signals and the radio signals via the metal frame, the device may provide a first signal path and a second signal path to the metal frame. The first signal path may be frequency selective in a first frequency range corresponding to the BCC signals, while the second signal path may be frequency selective in a second frequency range corresponding to the radio signals. The first signal path may have a low-pass filter characteristic and the second signal path may have a high-pass filter characteristic. The first and the second signal path may for example be provided by one or more frequency selective elements, such as the above-mentioned high-pass filters of the grounding connections 220, the above-mentioned low-pass filter(s) and/or resonant circuit(s) of the BCC feed connections 230, and/or the above-mentioned high-pass filters and/or matching circuits of the radio feed connections 240.

It should be understood that the steps of the method of FIG. 7 do not need to be performed in the illustrated order. In particular, the generation of the BCC signals of step 710 may also be performed simultaneously with the generation of the radio signals of step 720, and at step 730 the BCC signals and the radio signals may provided simultaneously to the metal frame.

FIG. 8 illustrates a method which may be used for receiving of data by the device.

At step 810, the device receives BCC signals via the metal frame of the device. The BCC signals may for example be in a first frequency range below 50 MHz, more specifically below 20 MHz.

At step 820, the device may receive radio signals. This is accomplished via the metal frame. The radio signals may for example be in a second frequency range above 400 MHz, typically above 600 MHz. The radio signals may be based on one or more cellular radio technologies, e.g., GSM, UMTS, LTE, CDMA2000. In addition or as an alternative, the radio signals may be based on a WLAN technology and/or on a WPAN radio technology, such as Bluetooth, NFC, or Zig- Bee. Further, the radio signals may be based on a satellite navigation technology, such as GPS.

Accordingly, the metal frame of the device may act as a BCC coupling element for transferring the BCC signals from the body of the user to the device, e.g., by conductive coupling or a combination of conductive coupling and capacitive coupling. Further, the metal frame may be operated to convert electromagnetic waves to the radio signals.

At step 830, the device may further process the radio signals and the BCC signals received by the metal frame. This may be accomplished by providing a first signal path and a second signal path. The first signal path may be frequency selective in a first frequency range corresponding to the BCC signals, and the second signal path may be frequency selective in a second frequency range corresponding to the radio signals. The first signal path may have a low-pass filter characteristic and the second signal path may have a high-pass filter characteristic. The first and the second signal path may for example be provided by one or more frequency selective elements, such as the above-mentioned high-pass filters of the grounding connections 220, the above-mentioned low-pass filter(s) and/or resonant circuit(s) of the BCC feed connections 230, and/or the above-mentioned high-pass filters and/or matching circuits of the radio feed connections 240.

By the first signal path and the second signal path, the BCC signals and the radio signals may be separated from each other. This allows for separate further processing of the received BCC signals and the received radio signals, e.g., by the BCC transceiver 120 and the radio transceiver 125, respectively. For example, such further processing may involve demodulation or decoding to obtain data. Still further processing may be accomplished by the processor(s) 140 executing the program code of the BCC communication module 160, and the radio communication module 170.

It should be understood that the steps of the method of FIG. 8 do not need to be performed in the illustrated order. In particular, the reception of the BCC signals of step 810 may also be performed simultaneously with the reception of the radio signals of step 820.

Further, it should be understood that the sending of data as illustrated by FIG. 7 and the receiving of data as illustrated by FIG. 8 may be combined to achieve bidirectional transmission of data.

As can be seen, the concepts as explained above allow for efficiently supporting BCC connectivity of a device. In particular, the metal frame may be used for achieving highly effective coupling of the BCC signals to the user's body by also utilizing the possibility of conductive coupling. Further, the metal frame may at the same time be utilized as an antenna for transmission of radio signals.

It is to be understood that the concepts as explained above are susceptible to various modifications. For example, the concepts could be applied in various kinds of devices and in connection with various types of radio technologies. Further, the concepts are not limited to a specific implementation of the BCC technology. Further, it is to be understood that while the above examples refer to bidirectional communication by means of a BCC transceiver and radio transceiver, also unidirectional implementations are possible, e.g., in which the device is equipped with a unidirectional BCC transmitter or a unidirectional BCC receiver.

The invention claimed is:

1. A device, comprising:
  at least one communication module supporting communication on the basis of body-coupled-communication signals, and
  a metal frame forming a part of an outer surface of the device, wherein the device includes a front side and a display which is visible on the front side, wherein the metal frame peripherally surrounds the front side, and wherein the metal frame is operable to provide conductive coupling of the body-coupled-communication signals to a body of a user of the device.

2. The device according to claim 1,
  wherein the at least one communication module further supports communication on the basis of radio signals, and
  wherein the metal frame is further operable as an antenna for transmission of the radio signals.

3. The device according to claim 2,
  wherein the antenna is of a capacitively and/or inductively fed type.

4. The device according to claim 2,
  wherein the radio signals are based on a cellular radio technology.

5. The device according to claim 2,
  wherein the radio signals are based on a wireless local area network technology.

6. The device according to claim 2,
  wherein the radio signals are based on a wireless personal area network radio technology.

7. The device according to claim 2,
  wherein the radio signals are based on a satellite navigation technology.

8. The device according to claim 2, comprising:
  at least one frequency selective element connected between the metal frame and the at least one communication module, the at least one frequency selective element providing a first signal path in a first frequency range corresponding to the body-coupled-communication signals and a second signal path in a second frequency range corresponding to the radio signals.

9. The device according to claim 8,
  wherein the first frequency range is below 50 MHz and the second frequency range is above 400 MHz.

10. The device according to claim 8,
  wherein the first signal path has a low-pass filter characteristic and the second signal path has a high-pass filter characteristic.

11. The device according to claim 8
  wherein the first signal path comprises a resonant circuit having a resonant frequency in the second frequency range.

12. The device according to claim 1, comprising:
  an electrode operable to provide capacitive coupling of the body-coupled-communication signals to the body of the user.

13. The device according to claim 12,
  wherein the electrode is electrically isolated from the outer surface of the device.

14. The device according to claim 8,
  wherein the device is configured to prevent simultaneous contact of the body of the user with the metal frame and said electrode.

15. The device according to claim 1,
  wherein the metal frame forms a single continuously conductive surface around a periphery of the device.

16. The device according to claim 1,
  wherein the metal frame forms multiple conductive surfaces arranged around a periphery of the device.

17. A method, comprising:
  a device communicating data on the basis of body-coupled-communication signals; and via a metal frame forming a part of an outer surface of the device, wherein the device includes a front side and a display which is visible on the front side, and wherein the metal frame peripherally surrounds the front side, the device providing conductive coupling of the body-coupled-communication signals to a body of a user of the device.

18. The method according to claim 17, comprising:
the device communicating data on the basis of radio signals; and
the device utilizing the metal frame as an antenna for transmission of the radio signals.

19. The method according to claim 18,
wherein the radio signals are based on at least one of: a cellular radio technology, a wireless local area network technology, a wireless personal area network radio technology, and a satellite navigation technology.

20. The method according to claim 18, comprising:
the device providing a first signal path to the metal frame, the first signal path being frequency selective in a first frequency range corresponding to the body-coupled-communication signals; and
the device providing a second signal path to the metal frame, the second signal path being frequency selective in a second frequency range corresponding to the radio signals.

21. The method according to claim 20,
wherein the first frequency range is below 50 MHz and the second frequency range is above 400 MHz.

* * * * *